United States Patent [19]

Kuroki

[11] Patent Number: 4,502,775
[45] Date of Patent: Mar. 5, 1985

[54] CAMERA FLASH PHOTOGRAPHING CONTROL DEVICE

[75] Inventor: Yoshifumi Kuroki, Tokyo, Japan

[73] Assignee: Asahi Kogaku Kabushiki Kaisha, Tokyo, Japan

[21] Appl. No.: 464,894

[22] Filed: Feb. 8, 1983

[30] Foreign Application Priority Data

Feb. 7, 1982 [JP] Japan ................................. 57-17635

[51] Int. Cl.[3] ...................... G03B 7/091; G03B 15/05
[52] U.S. Cl. ..................................... 354/416; 354/410
[58] Field of Search ........................ 354/23 D, 32–35, 354/145, 145.1, 416, 417, 458, 441–452, 410; 315/241 P

[56] References Cited

U.S. PATENT DOCUMENTS

| | | | |
|---|---|---|---|
| 3,988,069 | 10/1976 | Kitaura ........................... | 354/458 X |
| 4,162,839 | 7/1979 | Mashimo et al. ............... | 354/442 X |
| 4,297,011 | 10/1981 | Adams, Jr. ........................ | 354/416 |
| 4,297,012 | 10/1981 | Nakai ............................. | 354/442 X |

Primary Examiner—William B. Perkey
Attorney, Agent, or Firm—Fleit, Jacobson, Cohn & Price

[57] ABSTRACT

A camera flash photographing control device having a signal conversion element which generates step wave voltage for which a signal level is gradually varied as time passes, by the operation of a counter which receives a pulse signal. A signal conversion element is operated as an A-D converter in which digital signal output which corresponds to a required signal level is obtained by converting both analogue signals of luminance information of an object and iris information of a photographing lens into said required signal level at the time of light measurement before shutter release. A signal conversion element is operated as a digital-analogue converter in which analogue signal output which corresponds to a pulse signal is obtained by converting the digital signal input of film sensitivity information into a required pulse signal at the time of shutter control after shutter release. Digital signal output from a signal conversion element is stored in memory as camera photographing information at the time of shutter control and analogue signal output from a signal conversion element is sent as information on the degree of flash light emission at the time of shutter control.

6 Claims, 7 Drawing Figures

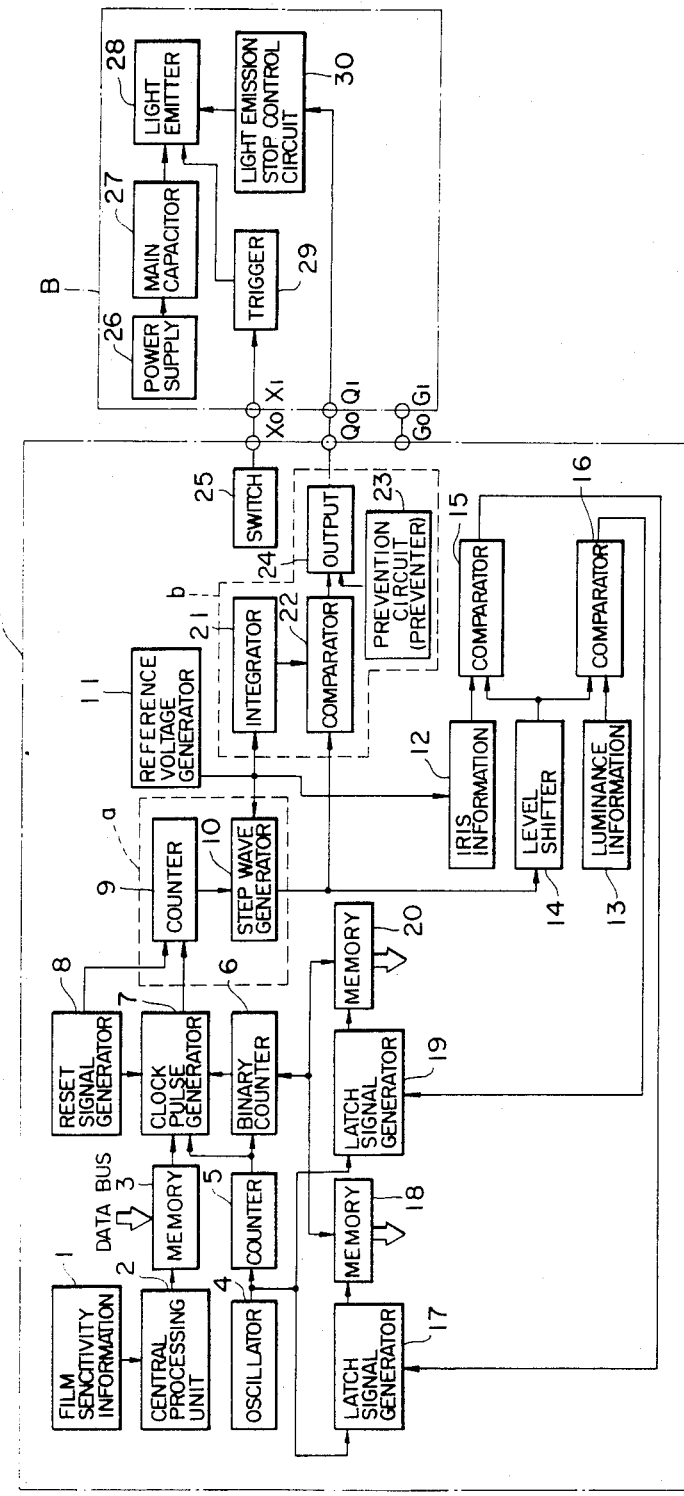
F I G. 1

F I G. 4
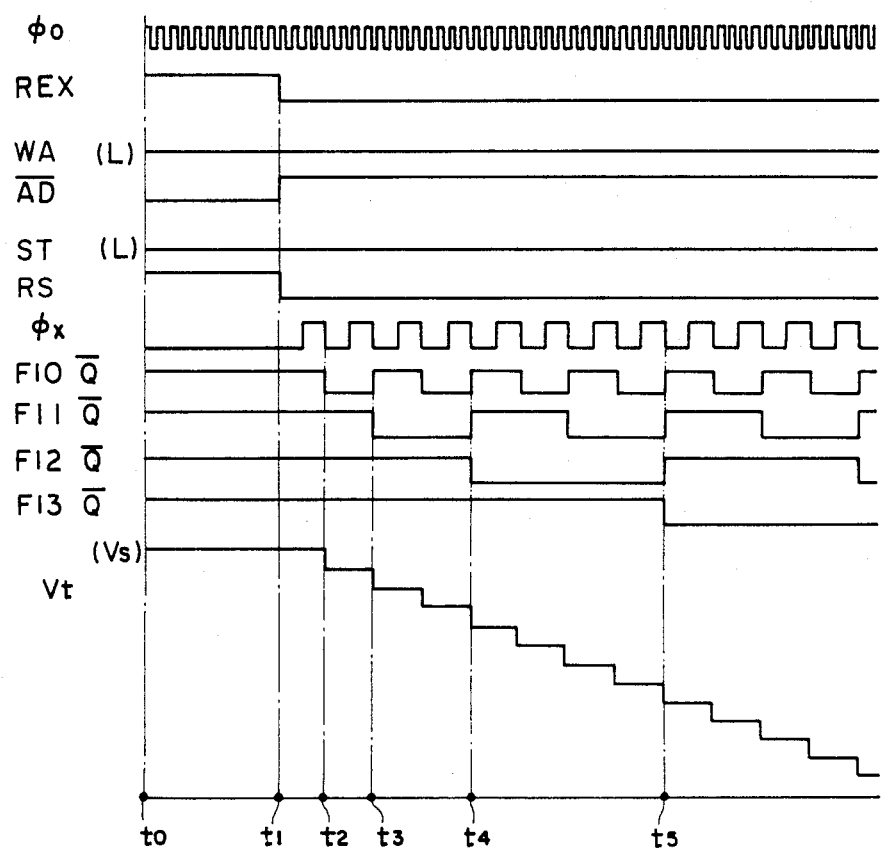

CAMERA FLASH PHOTOGRAPHING CONTROL DEVICE

BACKGROUND OF THE INVENTION

1. Field of the Invention

The invention is related to a camera flash photographing control device, in which digital or analogue information for photographing obtained on the camera side are once digital-processed, and information for controlling a shutter is obtained by analogue means to control the degree of flash light emission.

2. Description of the Prior Art

Generally, when camera flash light photographing is automatic, conditions for photographing are set by a camera iris mechanism, information to be obtained at the time of light measurement of an object or information required for exposure of film, shutter and an iris, as well as the degree of flash light emission are controlled on the basis of these set conditions for photographing. In this case, information obtained from the brightness of an object and sensitivity of film are detected as a level of an analogue signal converted to a voltage level at a resistor or a capacitor in many cases. For final control of the degree of flash light emission, means in which discharge charge corresponding to the degree of light emission thereof is integrated are used in many cases. Therefore, the degree of flash light emission is usually analogue-processed. Thus, no inconvenience occurs if all these pieces of information can be analogue-processed simply and precisely when information to be input is a level of analogue.

However, there are various bits of information for determining conditions for photographing, and these have complicated mutual relationships in many cases. Therefore, it is difficult to analogue-process all information without sacrificing the operability of a camera device. This explains why analogue processing means have more complicated circuitry than that by digital processing means. Thus, it is recommended to process once after converting information to digital signal, even when information is input as a level of analogue signal. Most camera devices these days incorporate a digital processing circuit.

Sometimes, it is more convenient to directly detect, for instance, sensitivity information of a film along with information for setting conditions for photographing as digital information using a gray code plate, etc. In this case, information to be input includes information on the sensitivity of film as a digital signal, and luminance information of an object and iris information of a photographing lens, etc. both of which are analog signals and are obtained at the time of light measurement. Thus, at least two analogue-digital (A-D) converters are required to process this latter information. Information on the sensitivity of film to be input as a level of a digital signal is input into the digital-analogue (D-A) converter after being processed in an arithmetic circuit into which information on luminance and iris output from each A-D converter are input. In the prior art, the degree of flash light emission is controlled by comparing output corresponding to this D-A converted information on film sensitivity with output of an integrator which integrates according to the degree of flash light emission in analogue. Thus, traditional devices required at least two A-D converters and one D-A to control the degree of flash light emission.

However, requirement of several converters is not satisfactory for a camera device for which simplification of circuitry is desired. Therefore, means for integrating each converter to perform D-A and A-D conversions simultaneously have been demanded.

SUMMARY ON THE INVENTION

The invention has been made to meet this demand. Its aim is to provide a camera flash light photographing control device in which analogue information as photographing information which can be set before release or at the time of light measurement of an object, is A-D converted by a signal conversion unit utilizing a step wave. Digital information which has been computer processed as necessary information after release or at the time of shutter control, is D-A converted in a signal conversion unit to obtain information on the degree of flash light emission.

THE BRIEF DESCRIPTION OF THE DRAWINGS

FIG. 1 is a block diagram showing an embodiment of the invention.

FIG. 4 is a time chart showing the relationship between a control signal, etc. and a step wave which is generated based on a pulse signal.

Figure 2:
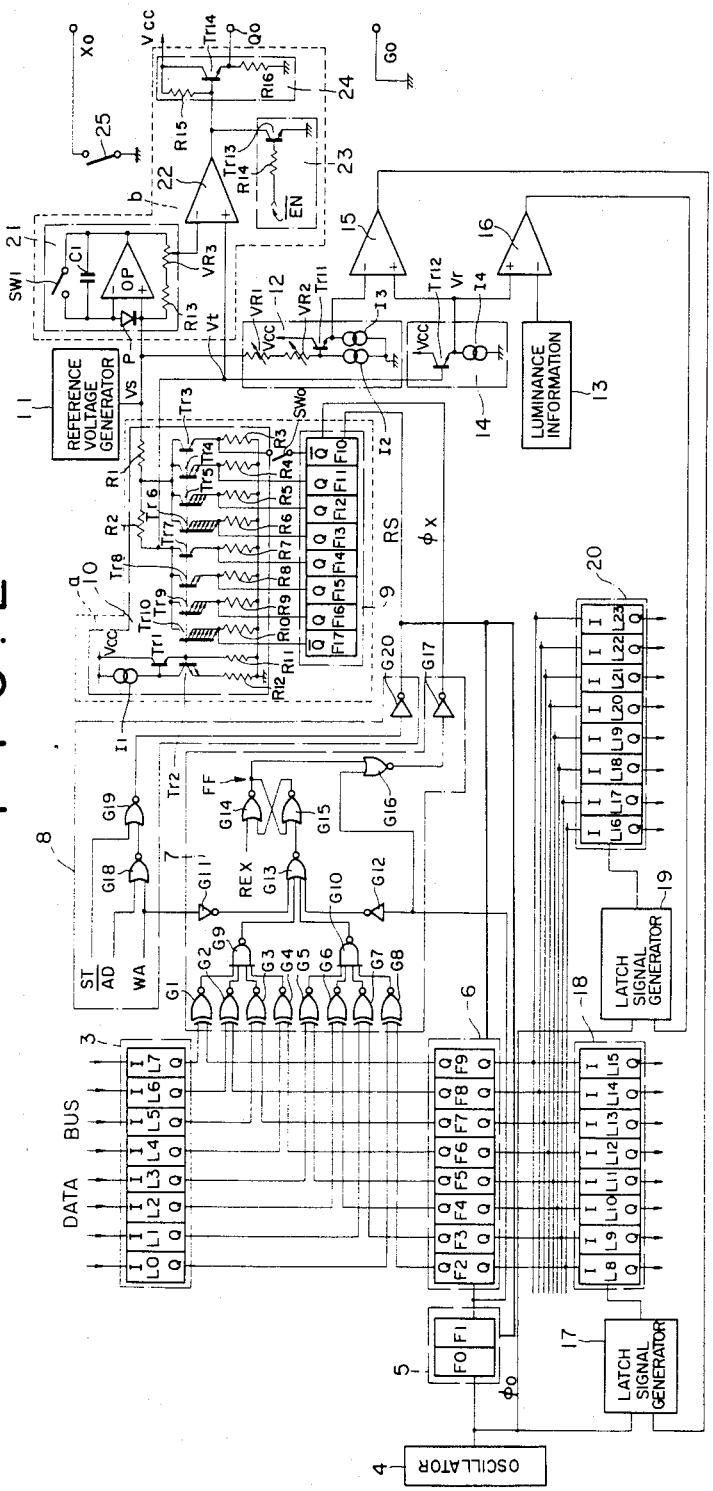
FIG. 2 is an electric circuit diagram showing more detailed embodiment of circuit in FIG. 1.

| 9 counter | 18, 20 memory; |
| a signal conversion element; | x pulse signal; |
| $V_t$ step wave voltage | |

DETAILED DESCRIPTION OF THE INVENTION

The invention is illustrated diagramatically in the following drawings wherein:

FIGS. 1~7 show an embodiment of the invention.

First the design and construction of a device which embodies the invention is described. In FIG. 1, symbol A indicates a circuit on the camera side and symbol B a circuit on the flash side. Circuits A and B are connected through terminals $X_0$, $Q_0$, $G_0$ and terminals $X_1$, $Q_1$, $G_1$ which are mounted on a connecting code connector or a hot shoe unit, respectively.

Symbol 1 in circuit A is a film sensitivity information input circuit. Said film sensitivity information input circuit 1 gradually outputs film sensitivity, the same as, for instance, said gray code plate to obtain digital signal. Said film sensitivity information input circuit 1 is connected to central processing unit 2. Said central processing unit 2 processes input information and sets the conditions for photographing required for controlling camera exposure and sends its computing output to a data bus. Data bus output, including film sensitivity information, is supplied to memory 3 to be stored by a latch signal.

Symbol 4 is an oscillator. Said oscillator 4 is activated by turning on the power supply of a camera device to generate a clock signal that is an original signal required for controlling a camera device. Oscillator 4 is connected to counter 5. Said counter 5 divides said clock signal to, for instance, ½. Said counter 5 is connected to, for instance, 8 bit binary counter 6. Counter 5 and binary counter 6 are connected to clock pulse generator 7. Binary counter 6 converts various input information required for flash light photographing to a digital signal. Clock pulse generator 7 receives the output of said memory 3. It is designed to coincide film sensitivity information input from memory 3 with counter information obtained from binary counter 6. Clock pulse generator 7 is connected to reset signal generator 8, as well as to counter 9 of signal conversion element a to control the generation of clock pulse is controlled by various control signals. Film sensitivity information corresponding to the number of clock pulses is obtained. Reset signal generator 8 operates to reset counter 9.

Signal conversion element a consists of counter 9 and step wave generator 10 which is connected thereto. Counter 9 is, for instance, an 8 bit binary counter. Step wave generator 10 connected to reference voltage generator 11 is designed so that the step wave voltage of step wave generator 10's output and a reference voltage obtained from reference voltage generator 11 have the same electric potential when counter 9 is reset.

Reference voltage generator 11 is connected to iris information detector 12 which detects iris information. Said iris information detector 12 which converts the aperture value of photographing lens to an electrical signal for which the level is adjustable. Iris information and luminance information on brightness which will be input information for setting conditions for photographing, are obtained from luminance information detector 13. Said luminance information detector 13 outputs light reflected by an object as a luminance information signal by photoelectric conversion. Iris information and luminance information obtained in this way are both analogue-type information. Level shifter 14 is provided to convert a detection level of these pieces of information to a step wave voltage level of said step wave generator 10.

Output voltage of level shifter 14 is supplied to non-inversion input terminals of comparators 15 and 16. Output of iris information detector 12 and luminance information detector 13 are supplied to inversion input terminals of comparators 15 and 16. Outputs of comparators 15 and 16 are supplied to latch signal generators 17 and 19, respectively. Therefore, comparators 15 and 16 are part of the means for generating two A/D conversion signals corresponding to the luminous and iris information respectively. Latch signal generators 17 and 19 are connected to memories 18 and 20, respectively. These latch signal generators 17 and 19 are means for noting the digital count values generated by counter 6 upon receipt of A/D conversion control signals. Output of oscillator 4 is supplied to latch signal generators 17 and 19. Output of binary counter 6 is supplied to memory 18 and 20. A latch signal, or conversion control signal, is a timing obtained by the oscilation pulse of oscillator 4 when the output of comparators 15 and 16 becomes low level from high level.

Information pertaining to binary counter 6 is latched by this latch signal to store in memories 18 and 20. Iris information and luminance information stored in memory 18 and 20, respectively, are sent to a data bus.

Symbol b is a light control unit to send a signal which controls the degree of light emission to circuit B on the flash side. Light control unit b has integrator 21. Integrator 21 integrates output corresponding to the degree of reflective light from an object emitted by flash light emission, receiving reference voltage of said reference voltage generator 11. Output of integrator 21 is supplied to comparator 22. Output voltage of step wave voltage generator is supplied to comparator 22. After shutter release, output voltage of step wave generator 10 corresponds to the signal level of D-A converted film sensitivity information. This signal level and output of integrator 21 are compared in comparator 22. Output level of comparator 22 becomes greater at the point when the output level of integrator 21 becomes lower than the signal level of film sensitivity information. Output of comparator 22 is supplied to terminal $Q_0$ through output circuit 24. Prevention circuit (preventer) 23 is connected to output circuit 24. Prevention circuit (preventer) 23 prevents error information from being transmitted to the flash side when comparator 22 cannot obtain fixed output before release, that is, at the time of light measurement of an object. Symbol 25 is an X contact switch which is closed in synchrony with shutter activation and is connected to terminal $X_0$.

Next, circuit B on the flash side is described. Symbol 26 is a power supply circuit. Power supply circuit 26 increases the voltage of a battery which is the power supply for high voltage. Output of power supply circuit 26 is supplied to main capacitor 27 to accumulate electric charge, which is required to generate flash light. Main capacitor 27 is connected to light emitter 28. Light emitter 28 is activated by a trigger signal of trigger circuit 29 and connected to light emission stop control circuit 30 connected to terminal $Q_1$. Terminal $G_1$ is a ground terminal. It is connected to terminal $G_0$ to ground electric potential of circuits A and B equally.

FIG. 2 shows a more detailed embodiment of circuit A on the camera side. According to this, memory 3 is composed of 8 bit latch circuits $L_0 \sim L_7$. Each input terminal I is connected to a data bus. Output terminal Q of latch circuits $L_0 \sim L_7$ is connected to one input terminal of gates $G_8 \sim G_1$ of identification circuit means which is part of clock pulse generator means 7. Output terminals of gates $G_1 \sim G_4$ are connected to each input terminal of 4 input NAND gate $G_9$. Output terminals of gates $G_5 \sim G_8$ are connected to each input terminal of other 4 input NAND gate $G_{10}$. Output terminal of NAND gates $G_9 \sim G_{10}$ are connected to two input terminals of 4 input NOR gate $G_{13}$. Output sides of inverters $G_{11}$ and $G_{12}$ are connected to another two input terminal. Output terminal of NOR gate $G_{13}$ is connected to the input terminal of NOR element $G_{15}$, which comprises the flip-flop circuit FF or setting circuit means. Operation control signal REX is supplied to the input terminal of another NOR element $G_{14}$. The output terminal of flip-flop circuit FF is connected to one input terminal of NOR gate $G_{16}$. Input side inverter $G_{12}$, that is, the output side of counter 5, is connected to another input terminal thereof. Output terminal of NOR gate $G_{16}$ is connected to the input side of inverter buffer $G_{17}$. Pulse signal $\phi x$ is obtained from the output side of buffer $G_{17}$. Gates $G_1 \sim G_8$ and flip-flop FF are part of the means for stopping the pulse signal train $\phi x$ upon receipt of operation control signal WA and upon a correspondence between the output of counter 6 and the digital film sensitivity information stored in memory 3. Clock signal $\phi_0$ obtained from oscillator 4, is divided by counter 5. The counter is comprised of 2 step flip-flops $F_0$ and $F_1$. Binary counter 6, which is the first counter means, clocked by the output of counter 5, is comprised of 8 step flip-flops $F_2 \sim F_9$ and produces digital count valves. One output terminal Q of flip-flops $F_2 \sim F_9$ are connected to another input terminal of said gates $G_8 \sim G_1$. Other output terminals Q of flip-flops $F_2 \sim F_9$ are respectively connected to input terminal I of latch circuits $L_8 \sim L_{15}$ which comprises memory 18. Input terminal I of latch circuits $L_{16} \sim L_{23}$, which comprise memory 20, are respectively connected to other output terminals Q of flip-flops $F_2 \sim F_9$. Output terminals Q of each latch circuits $L_8 \sim L_{15}$ and $L_{16} \sim L_{23}$ are connected to a data bus.

Reset signal generator 8 is comprised of NOR gates $G_{18}$ and $G_{19}$ and inverter buffer $G_{20}$. Other operating control signals AD, WA, obtained from the camera side, are supplied to two input terminals of NOR gate $G_{18}$. The reset signal generator 8 is the means for resetting. The input side of clock pulse generator 7's inverter $G_{11}$ is connected to an input terminal on the side to which control signal WA is supplied. The output terminal of NOR gate $G_{18}$ is connected to other input terminal of NOR gate $G_{19}$. Another operating control signal ST is supplied to another input terminal of NOR gate $G_{19}$. The output terminal of NOR gate $G_{19}$ is connected to the input side of buffer $G_{20}$.

Counter 9, the second counter means, which comprises signal conversion element a, is comprised of 8 step flip-flops $F_{10} \sim F_{17}$. Counter 9 is reset by reset signal RS and clocked by pulse signal $\phi x$. Output terminal $\overline{Q}$ of flip-flops $F_{10} \sim F_{17}$ are respectively connected to emitters of transistors $Tr_3 \sim Tr_{10}$, which comprise step wave generator 10. Step wave generator 10 has fixed current supply $I_1$. Upper current side of fixed current supply $I_1$ is connected to fixed voltage supply $V_{cc}$, as well as to the collector of Transistor $Tr_1$. The base of transistor $Tr_1$ is connected to the lower current side of fixed current supply $I_1$, as well as to the collector of transistor $Tr_2$.

The emitter of transistor $Tr_1$ is connected to the base of transistor $Tr_2$ and grounded through resistor $R_{11}$. The emitter of transistor $Tr_2$ is grounded through resistor $R_{12}$. Transistor $Tr_2$ is multi-emitter transistor which has two emitters. Base of transistor $Tr_2$ is connected to each base of said transistor $Tr_3 \sim Tr_{10}$, respectively. Emitters of transistors $Tr_3 \sim Tr_{10}$ are grounded through resistors $R_3 \sim R_{10}$. Transistor $Tr_4$ and $Tr_8$ have two emitters; transistors $Tr_5$ and $Tr_9$ have four emitters and transistors $Tr_6$ and $Tr_{10}$ have eight emitters. They are multi-emitter transistors. Collectors of transistors $Tr_3 \sim Tr_6$ and those of transistors $Tr_7 \sim Tr_{10}$ are connected. Collectors of transistors $Tr_3 \sim Tr_6$ are connected to one terminal of resistor $R_2$. Collectors of transistors $Tr_7 \sim Tr_{10}$ are connected to another terminal of resistor $R_2$. Resistor $R_2$ is connected to resistor $R_1$ in series. One terminal of resistor $R_1$ is connected to the output terminal of reference voltage generator 11. Resistors $R_4$ and $R_8$, connected to emitters of $Tr_4$ and $Tr_8$, bring their resistance level to the same level as that of resistor $R_{12}$ so that collector current of transistor $Tr_2$, that is, fixed current supply $I_1$'s current is equal to collector current of transistors $Tr_4$ and $Tr_8$. Resistance level of resistors $R_3$ and $R_7$, connected to emitters of transistors $Tr_3$ and $Tr_7$, are two-fold that of resistor $R_{12}$. That is, to make collector current of transistors $Tr_3$ and $Tr_7$ ½ of fixed current supply $I_1$'s current. Resistance levels of resistors $R_5$ and $R_9$ are ¼ of that resistor $R_{12}$ to make collector current of transistors $Tr_5$ and $Tr_9$ double that of fixed current supply $I_1$'s. Resistance level of resistors $R_6$ and $R_{10}$ is ⅛ of that of resistor $R_{12}$ to make collector current of transistors $Tr_6$ and $Tr_{10}$ four-fold that of fixed current supply $I_1$'s. Resistor $R_2$ is designed so that its resistance level is 15-fold that of resistor $R_1$.

By this signal conversion element, emitters of transistors $Tr_3 \sim Tr_{10}$ are reversly biased and their collector current is cut-off, when output terminal $\overline{Q}$ of counter 9's flip-flops $F_{10} \sim F_{17}$ become high level. On the contrary, collector current of transistors $Tr_3 \sim Tr_{10}$ is conducted to resistors $R_3 \sim R_{10}$ through emitters. Therefore, above mentioned fact it is equivalent to providing a switching circuit to the output step of counter 9. When reset signal RS is input into counter 9 at high level, all output terminals of flip-flops $F_{10} \sim F_{17}$ become high level. Thus, it is designed so that collector current of transistors $Tr_3 \sim Tr_{10}$ are prevented from conducting current to resistors $R_1$ and $R_2$ and step wave voltage Vt obtained from connecting point between the collector of transistors $Tr_7 \sim Tr_{10}$ and resistor $R_2$ is equal to reference voltage Vs in reference voltage generator 11.

The output terminal of reference voltage generator 11 is connected to one terminal of level adjusting variable resistor $VR_1$ which comprises iris information detector 12. Another terminal is connected to one terminal of variable resistor $VR_2$ interlocked to the iris of a photographing lense. Another terminal of variable resistor $VR_2$ is connected to the upper current side of fixed current supply $I_2$, as well as to the base of transistor $Tr_{11}$. The collector of transistor $Tr_{11}$ is connected to fixed voltage supply $V_{cc}$, and its emitter is connected to fixed upper current side of fixed current supply $I_3$, as well as to the inversion input terminal of comparator 15. Both lower current sides of fixed current supplies $I_2$ and $I_3$ are grounded. Thus, transistor $Tr_{11}$ works as level converter.

On the other hand, collectors of transistors $Tr_7 \sim Tr_{10}$ in step wave generator 10 are connected to the base of transistor $Tr_{12}$ which comprises level shifter 14. The collector of transistor $Tr_{12}$ is connected to fixed voltage supply $V_{cc}$, and its emitter is grounded through fixed current supply $I_4$. The emitter of transistor $Tr_{12}$ is connected to non-inversion input terminals of comparators 15 and 16. Thus, transistor $Tr_{12}$ reduces the output level supplied by step wave generator 10 as much as voltage level between the base and emitter of transistor $Tr_{12}$ to convert that output level to an input level input into inversion input terminal of comparators 15 and 16.

Integrator 21, which comprises light control element b, has operation amplifier OP. Non-inversion input terminal of operation amplifier OP is connected to the output terminal of reference voltage generator 11, as well as to one terminal of iris information detector 12's variable resistor $VR_1$. One terminal of resistor $R_{13}$ and the cathode side of light receiving element P are connected to the non-inversion input terminal of operation amplifier OP. The anode side of light receiving element P and also one terminal of switch $SW_1$ and that of integration capacitor $C_1$ are connected to its inversion input terminal. Another terminal of switch $SW_1$ and that of integration capacitor $C_1$ and also one terminal of adjusting variable resistor $VR_3$ are connected to the output terminal of operation amplifier OP. Another terminal of variable resistor $VR_3$ is connected to another terminal of resistor $R_{13}$. The output terminal of variable resistor VR₃'s mid-point is connected to an inversion input terminal of comparator 22.

The output terminal of comparator 22 is connected to the base of transistor $Tr_{14}$ which comprises output circuit 24. This base is connected to its collector through resistor $R_{15}$. The collector of transistor $Tr_{14}$ is connected to fixed voltage supply $V_{cc}$. Its emitter is grounded through resistor $R_{16}$ and connected to terminal $Q_0$ on the camera side. The output terminal of comparator 22 is connected to the collector of transistor $Tr_{13}$ which comprises prevention circuit (preventer) 23. The base of transistor $Tr_{13}$ is connected to resistor $R_{14}$ to input an operation control signal $\overline{EN}$, and its emitter is grounded.

Figure 3:
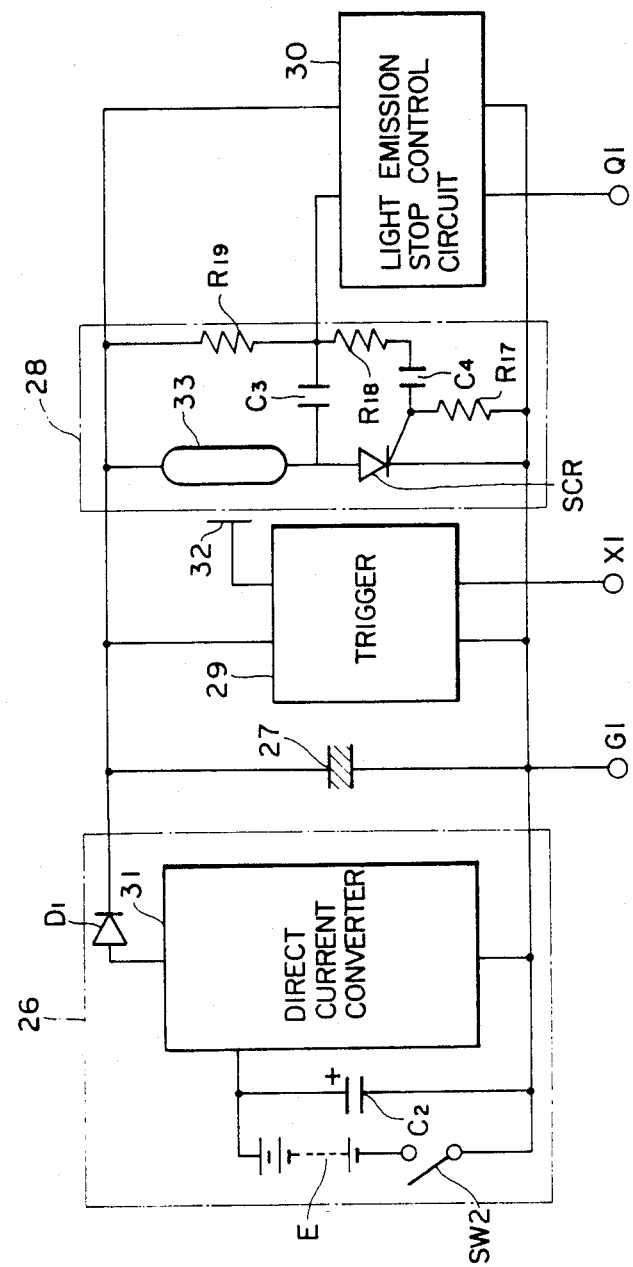
FIG. 3 is an electric circuit diagram showing more detailed embodiment of circuit in FIG. 1.

FIG. 3 shows a more detailed embodiment of circuit B on the flash side. According to this, the positive side of battery E, which comprises power supply circuit 26 as power supply, is connected to one terminal of coupling capacitor $C_2$ which controls output fluctuation. The negative side of battery E is grounded through switch $SW_2$. Another terminal of coupling capacitor $C_2$ is grounded. The positive side of battery E is connected to an input terminal of direct current converter 31. The anode of diode $D_1$ for preventing reverse current is connected to the output terminal of direct current converter 31. The cathode of diode $D_1$ is connected to one terminal of main capacitor 27, and its another terminal is grounded. One terminal of main capacitor 27 is connected to the power supply side of trigger circuit 29, as well as to the high tension side of discharge light emission tube 33 which comprises discharge light emitter 28. X contact terminal $X_1$ on the flash side is connected to the input terminal of trigger circuit 29. A trigger signal from X contact switch 25 is supplied to terminal $X_1$. Trigger 32 is connected to the output terminal of trigger circuit 29 to provide trigger voltage for light emission of discharge light emission tube 33. The anode of thyristor SCR and one terminal of capacitor $C_3$ are connected to the low voltage side of light emission tube 33. The cathode of thyristor SCR is grounded. Its gate is grounded through resistor $R_{17}$ and is connected to one terminal of resistor $R_{18}$ through capacitor $C_4$. Another terminal of resistor $R_{18}$ is connected to another terminal of capacitor $C_3$ and one terminal of resistor $R_{19}$ is connected to the connection point between them. Another terminal of resistor $R_{19}$ is connected to one terminal of main capacitor 27. The output terminal of light emission stop control circuit 30 is connected to a connection point between resistors $R_{18}$ and $R_{19}$. Thus, when a signal is input into light emission stop control circuit 30 from output circuit 24 on the camera side through terminal $Q_1$ on the flash side, the level of output of the circuit 30 becomes low, and thyristor SCR is cut-off to stop light emission arising from discharge light emission tube 33.

In description of FIGS. 2 and FIG. 3, the description which duplicates that of FIG. 1 is omitted.

Now, operation of the device is described in reference to FIGS. 4~7.

As shown in FIG. 4, oscillator 4 is activated to generator clock pulse signal $\phi_0$ when power supply is turned on at the time of photographing ($t_0$).

When the level of operation control signal REX input from the camera side into flip-flop circuit FF of clock pulse generator 7 at $t_1$ is reached, the output of NOR gate is changed and signal $\phi x$ arises. When the level of operation control signal $\overline{AD}$ (the first control signal), input from the camera side into NOR gate $G_{18}$ of reset signal generator 8, is change from high to low at that time, the output of reset signal generator 8, is changed from high to low and reset signal RS for resetting counter 9 is obtained, as both levels of another operation control signal WA (the third control signal) input into NOR gate $G_{18}$ and still another operation control signal ST (the second control signal) are low.

When pulse signal $\phi x$ is obtained from clock pulse generator 7, flip-flop $F_{10}$ is clocked in sequence at $T_2$, etc. which is a negative transition of pulse signal $\phi x$, and flip-flops $F_{11} \sim F_{17}$ which are located after flip-flop $F_{10}$, (these flip-flops being part of the second counter means), are respectively clocked at the time of negative transition ($t_3$, $t_4$, $t_5$, etc.) of output terminal $\overline{Q}$ of flip-flop which is located before flip-flop $F_{10}$. That is, output terminal $\overline{Q}$ of flip-flop $F_{10}$ varies in frequency which is two-fold of that of pulse signal $\phi x$. Output terminal of flip-flop $F_{11}$ varies in frequency which is four-fold that of signal pulse $\phi x$. Output terminal $\overline{Q}$ varies in frequency, which is eight-fold that of pulse signal $\phi x$. In the same manner, output terminal $\overline{Q}$ of flip-flops $F_{12} \sim F_1$ thereafter vary in large frequency, respectively generate a counting output signal therefrom. Therefore, collector current of transistors $Tr_3 \sim Tr_{10}$ vary in sequency to change the level of voltage drop of resistors $R_1$ and $R_2$ in the form of steps. Thus, step wave voltage $V_t$ whose level gradually drops as time passes by can be obtained at the connection point between the collector of transistors $Tr_7 \sim Tr_{10}$ and resistor $R_2$. As described before, a level of step wave voltage Vt is equal to reference voltage Vs of reference voltage generator 11 when turning on power supply.

Figure 5:
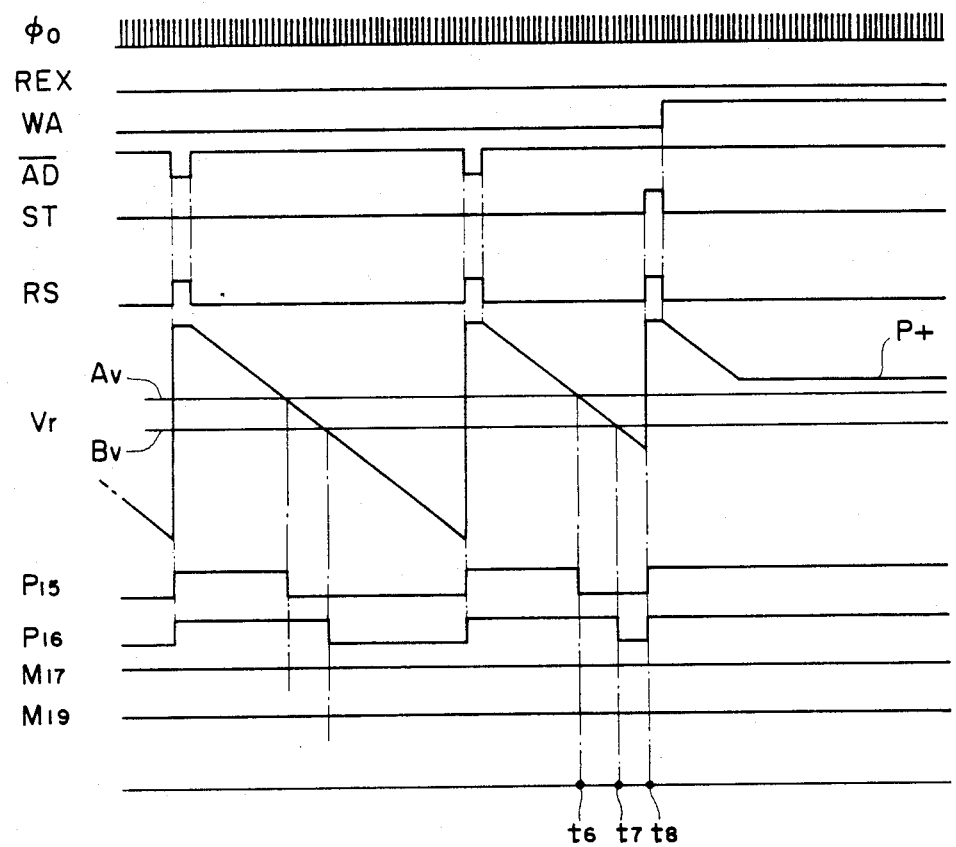
FIG. 5 is a time chart showing the relationship between the output voltage and an output of a comparator, etc. and operation control signal, etc.

Thus, as shown in FIG. 5, the level of reset signal RS is change from low to high, counter 9 is reset and the level of step wave voltage Vt becomes equal to reference voltage Vs of reference generator 11, when the level of operation control signal $\overline{AD}$ is changed from high to low. When the level of operation control signal $\overline{AD}$ is changed from low to high to terminate resetting period, step wave voltage Vt, for which a voltage level is dropped as time goes on, can be repeatedly obtained.

Fluctuation of step wave voltage Vt corresponds to that of output voltage Vr of level shifter 14.

Then, when output voltage Vr gradually drops and finally reaches voltage level AV a voltage which corresponds to level of inversion input terminal of comparator 15, which is iris information, level of output $P_{15}$ is changed from high to low at $t_6$. Thus, latch signal generator 17 samples clock signal $\phi_0$ at $t_6$ (refer to FIG. 5 $M_{17}$) to latch memory 18. When output voltage Vr further drops and reaches the voltage level of the inversion input terminal of comparator 16, which is luminance information; at $t_7$, the level of output $P_{16}$ of comparator 16 varies from high to low. Latch signal generator 19 samples clock signal $\phi_0$ at $t_7$ (refer to FIG. 5) to latch memory 20. Levels of output $P_{15}$ and $P_{16}$ of comparators 15 and 16 change from low to high when counter 9 is reset.

When camera photographing information is set after light measurement, the level of operation control signal ST is changed from low to high at $t_8$ to generate reset signal RS. Following the occurrence of a release pulse RP, an ST signal in the reset signal generating circuit becomes H (high) level (see FIG. 6) so that a reset signal RS appears resetting the counters 6 and 9. Then, upon fall of the operation control signal ST, another operation control signal WA becomes H level and the reset signal RS becomes L (low) level (see FIG. 5) so that the counters 9 and 6 are restored from the reset state; the counter 6 begins to count while at the same time the counter 9 receives the clock pulses from clock pulse generator 7, and thus these counters begin to operate synchronously. When the digital value stored in the counter 6 and the memory 3 becomes equal, the clock pulse generator 7 stops supplying clock pulses by the operation of an identity circuit means (gates G1–G8) which comprises part of the clock pulse generator 7, and accordingly the counter 9 will maintain the digital count value or counting output signal corresponding to the film sensitivity information. As a result, the step wave generator 10 will maintain an analog voltage unchanged due to the established digital count value.

Figure 6:
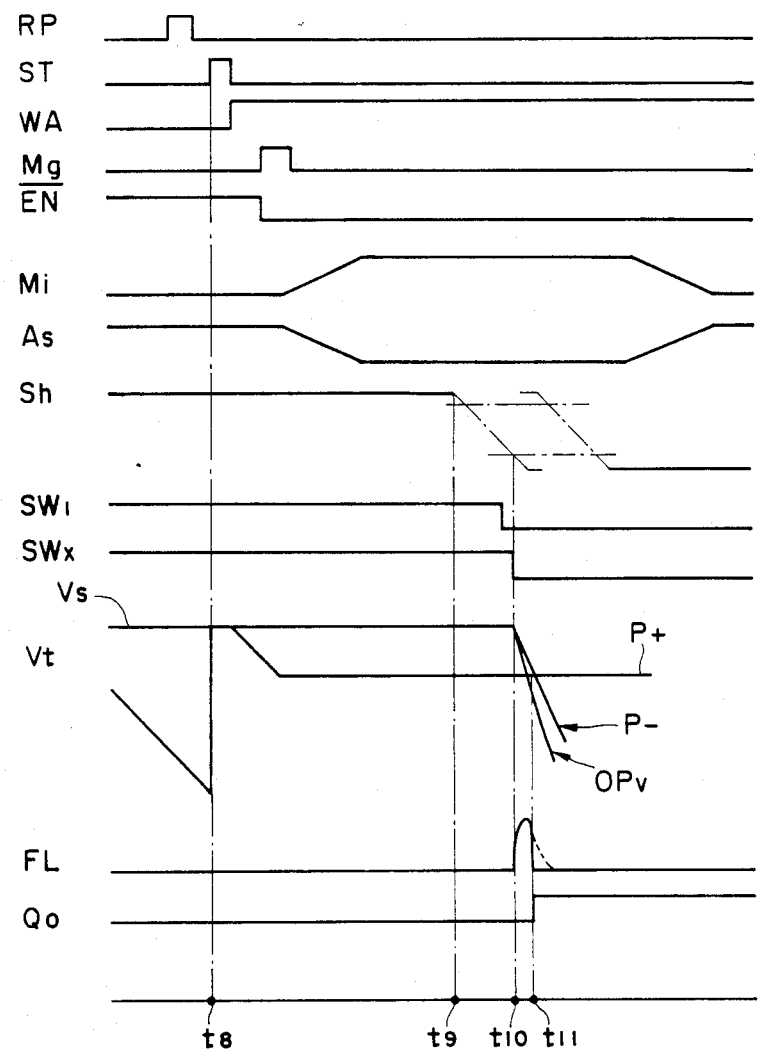
FIG. 6 is a time chart showing flash light emission controlled by film sensitivity information.

As shown in FIG. 6, release pulse RP is generated when control signal ST is generated after measurement. Pulse Mg for magnetizing a magnet which activates a mechanism interlocked with a release button is obtained by generating release pulse RP. Generation of pulse Mg changes a level of control signal $\overline{EN}$ which releases the prevention state of prevention circuit (preventer) 23 and activates comparator 22.

Generation of pulse Mg activates a mirror (refer to FIG. 6 Mi) and an iris starts closing simultaneously (refer to FIG. 6 As). Then, a shutter curtain starts running at $t_9$ (refer to FIG. 6 Sh) and closed switch SW$_1$ opens (refer to FIG. 6 SW$_1$). When X contact switch 25, which was opened at $t_{10}$, is closed (refer to FIG. 6 SWX) a flash starts light emission (refer to FIG. 6 FL). At the same time, electric potential OPv of arithmetic amplifier OP's output terminal of integrator 21 gradually drops and electric potential P of comparator 22's inversion input terminal starts gradually dropping. When electric potential P of comparator 22's inversion input terminal reaches electric potential P of non-inversion input terminal, which is a level of step wave voltage Vt corresponding to film sensitivity information, a level of output terminal of comparator 22 is inversed, a signal is sent from terminal Q$_0$ to light emission stop control circuit 30 on the flash side to stop light emission from a flash.

In said embodiment, digital information for photographing is D-A converted taking film sensitivity information as an example. It is acceptable to D-A to convert exposure compensation information for adjusting the degree of exposure according to an object as digital information.

Figure 7:
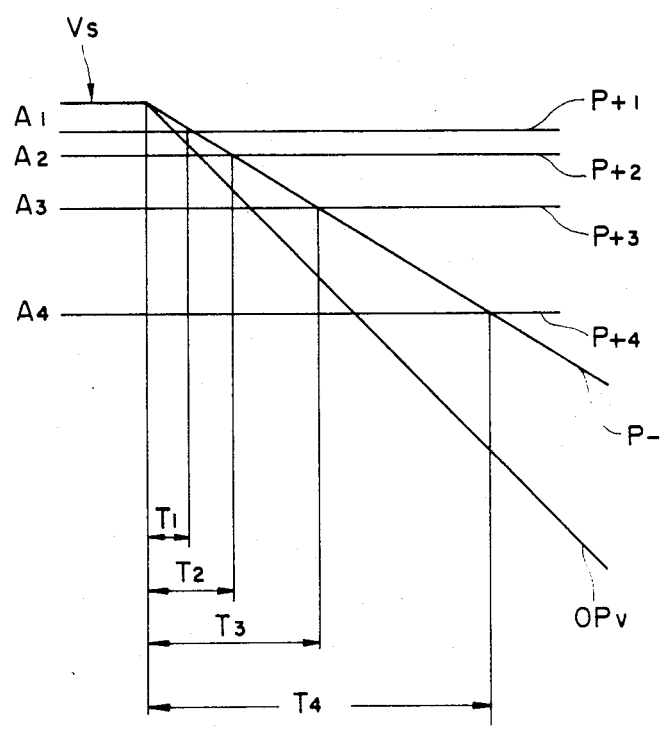
FIG. 7 is a drawing showing the relationship between film sensitivity information and integration time of an integrator.

As shown in FIG. 7, fluctuation of film sensitivity information corresponds to step wave voltage Vt, which is a level of electric potential $P_{+1}, P_{+2}, P_{+3}, \ldots$ of the non-inversion input terminal of comparator 22. Electric potentials $P_{+1}, P_{+2}$ and $P_{+3}$ drop as film sensitivity $A_1, A_2, A_3, \ldots$ drops. Times $T_1, T_2, T_3, \ldots$ which are determined at a point of intersection between said electric potentials $P_{+1}, P_{+2}$ and $P_{+3}$ and electric potential P of comparator 22's inversion input terminal corresponds to the time taken for integration time of integrator 21 which is the time taken for flash light emission time.

As described, according to the invention, a signal conversion element which generates step wave voltage for which a signal level is gradually varied as a time goes by, by the operation of a counter which receives a pulse signal, is provided, a signal conversion element is operated as an A-D converter in which digital signal output which corresponds to an analogue signal level is obtained by converting each analogue signal of luminance information of an object and iris information of a photographing lense into a required signal level at the time of light measurement before shutter release. A signal conversion element is operated as a digital-analogue converter in which analogue signal output which corresponds to a pulse signal is obtained by converting the digital signal input of film sensitivity information into a required pulse signal at the time of shutter control after shutter release; digital signal output from a signal conversion element is stored in memory as camera photographing information at the time of shutter control and analogue signal output from a signal conversion element is sent as information on the degree of flash light emission at the time of shutter control. Thus, A-D can be made simultaneously and simplification of a camera device can be attempted. Also, information required for photographing including film sensitivity information can be digital-processed, thus stable operation can be performed without being affected by temperature, power supply voltage, noise, etc. in camera flash photographing.

What is claimed is:

1. A camera with a flash photographing control device, said camera generating a first, a second and a third operation control signal and a release pulse, said release pulse activating a flash unit and said release pulse being generated by said camera at a time intermediate said first and second operation control signals, said camera generating luminous information of a photographing object and iris information of a photographic lens both as analog information prior to the generation of said release pulse, and said camera generating film sensitivity information in digital form and generating clock pulses, the control device comprising:

a first counter means receiving said clock pulses and producing digital count values based thereon;

a pulse signal generator means receiving said clock pulses and producing a related pulse signal train at a corresponding output, said pulse signal generator means including means for stopping said pulse signal train upon receipt of said third operation control signal from said camera and upon a correspondence between said digital count value applied to one input of said pulse signal generator means and the digital film sensitivity information applied at another input of said pulse signal generator means;

a second counter means receiving said pulse signal train, counting the individual pulses therein and applying a counting output signal at its output;

a step wave generator means coupled to said second counter means, said step wave generator means producing at its output a step wave whose signal level changes stepwise in response to each change of said counting output signal from said second counter means;

means for resetting said first and second counter means upon receipt of either said first or said second operation control signals generated by said camera;

means for generating two A/D conversion control signals corresponding to said luminous information and said iris information, respectively, said means for generating receiving said step wave and comparing the step wave level to the received analog luminous and analog iris information, respectively, and said means for generating applying at its output respective luminous and iris conversion control signals corresponding to the comparison; and means for noting the digital count values generated by said first counter means upon receipt of said luminous and iris conversion control signals, respectively.

2. A camera with a flash photographing control device as claimed in claim 1, in which said second counter includes a plurality of multi step flip-flops being connected together and said step wave generator changes a level of voltage drop in resistors connected to said second counter and generates step wave corresponded to a signal level change caused by the voltage drop therein.

3. A camera with a flash photographing control device as claimed in claim 1, wherein said digital count values correspond to an electric signal converted from an aperture value by an iris information detector and light reflected by an object which is photoelectrically converted by a luminance information detector.

4. A camera with a flash photographing control device, said camera generating a first, a second and a third operation control signal and a release pulse, said release pulse activating a flash unit and said release pulse being generated by said camera at a time intermediate said first and second operation control signals, said camera generating luminous information of a photographic object and iris information of a photographic lens both as analog information prior to the generation of said release pulse, and said camera generating film sensitivity information in digital form and generating clock pulses, the control device comprising:

a first counter means receiving said clock pulses and producing digital count values based thereon;

a pulse signal generator means receiving said clock pulses and producing a related pulse signal train at a corresponding output, said pulse signal generator means including a setting circuit means and an identification circuit means, said identification circuit means being activated by said setting circuit means upon receipt of said third operation control signal from said camera, and said identification circuit means being capable of stopping said pulse signal train when said digital count value applied at one input of said identification circuit means corresponds to the digital film sensitivity information applied at another input of said identification circuit means;

a second counter means receiving said pulse signal train, counting the individual pulses therein and applying a counting output signal at its output;

a step wave generator means coupled to said second counter means, said step wave generator means producing at its output a step wave whose signal level changes stepwise in response to each change of said counting output signal from said second counter means;

means for resetting said first and second counter means upon receipt of either said first or said second operation control signals generated by said camera;

means for generating two A/D conversion control signals corresponding to said luminous information and said iris information, respectively, said means for generating receiving said step wave and comparing the step wave level to the received analog luminous and analog iris information, respectively, and said means for generating applying at its output respective luminous and iris conversion control signals corresponding to the comparison;

digital memory means coupled to said first counter means and said means for generating, said digital memory means storing corresponding digital count values generated by said first counter means upon receipt of said luminous and iris conversion control signals, respectively; and said pulse signal generator means being inhibited from producing said pulse signal train at its output due to activation of said identification circuit means and said setting circuit means, said second counter means generating and holding the counting output signal corresponding to said film sensitivity information due to the cessation of said pulse signal train supplied thereto, and said step wave generator producing and retaining the step wave level as an analog signal output due to the established counting output signal corresponding to said film sensitivity information.

5. A camera with a flash photographing control device as claimed in claim 4, in which said second counter includes a plurality of multi step flip-flops being connected together and said step wave generator changes a level of voltage drop in resistors connected to said second counter and generates step wave corresponded to a signal level change caused by the voltage drop therein.

6. A camera with a flash photographing control device as claimed in claim 4, wherein said digital count values correspond to an electric signal converted from an aperture value by an iris information detector and light reflected by an object which is photoelectrically converted by a luminance information detector.

* * * * *